United States Patent Office
2,953,610
Patented Sept. 20, 1960

2,953,610

CONDENSATION PROCESSES

Harold H. Zeiss and Walter Herwig, Dayton, Ohio, assignors to Monsanto Chemical Company, St. Louis, Mo., a corporation of Delaware No Drawing. Filed June 2, 1958, Ser. No. 738,953

13 Claims. (Cl. 260—673)

The present invention is directed to the polymerization of organic compounds containing unsaturated carbon-to-carbon or carbon-to-nitrogen bonds in the presence of covalent chromium compounds, particularly tri-covalent organo chromium compounds.

The invention is particularly directed to the condensation of $\pi$-electron systems to 6-membered rings by means of tri-covalent organo chromium compounds, and is especially directed to such condensations of acetylene systems to aromatic systems. The invention is more specifically concerned with the condensation of di-substituted acetylenes to aromatic compounds in the presence of trialkyl or triaryl chromium compounds. In one aspect the invention concerns the condensation of alkynes of say 4 to 10 or more carbon atoms with triaryl or trialkyl chromium compounds to form arenes.

In another aspect the invention is directed to the process of reacting together chromium halide, magnesium, an organic halide capable of forming a Grignard reagent, and an acetylene containing no acidic hydrogen to obtain arenes.

The invention is further directed to trialkyl chromium compounds, the same being useful as condensation catalysts, particularly for the condensation of di-substituted acetylenes to substituted benzenes.

An object of this invention is to prepare catalysts suitable for the condensation of $\pi$-electron systems to 6-membered rings. A further object of the invention is to prepare covalent trialkyl chromium compounds in stable form.

Another object of the invention is to provide a good method of synthesis of substituted benzenes from di-substituted acetylenes.

The tri-covalent chromium compounds utilized herein can be obtained by reaction of Grignard reagents with trivalent chromium compounds, and the organic portion of the chromium compounds can be any organic radicals capable of forming Grignard reagents. Specific procedures suitable for the preparation of triaryl chromium compounds are described in our copending application, S.N. 698,376, filed November 25, 1957, and any of the procedures described therein, either generically or specifically, are also applicable here. The trialkyl chromium compounds can be prepared by corresponding procedures utilizing alkyl Grignard reagents as described herein below. It will be realized that effective catalysts can be produced in which the alkyl and aryl radicals are modified by groups which do not prevent the production of Grignard reagents, this being particularly true in the case of inert substitutents which do not change the fundamental hydrocarbon character of the radicals. Any aromatic or aliphatic halogen compounds are suitable so long as they do not contain active hydrogen atoms or other groups capable of causing extensive destruction of the Grignard reagents. Suitable organic halogen compounds are set forth in our aforesaid copending application S.N. 698,376. It will be realized that any hydrocarbon radicals, including cycloalkyl radicals, are suitable as the groups attached to chromium, the saturated hydrocarbon radicals being preferred in the case of non-cyclic radicals. In the case of aryl radicals, mono-, di-, tri- or polycyclic radicals are suitable, e.g., benzenes, naphthalenes, phenanthrenes, anthracenes, etc.; any of the aryl radicals disclosed in our aforesaid copending application S.N. 698,376 are also applicable here. As to the alkyl radicals attached to chromium, those straight or forked-chain alkyl radicals containing about 1 to 20 carbon atoms will ordinarily be employed, particularly those in the range of 1 to 10 or so carbon atoms; for example, methyl, ethyl, n-propyl, isopropyl, n-butyl, isobutyl, sec-butyl, t-butyl, n-pentyl and each of its isomers, n-hexyl, n-heptyl, n-octyl, 2-ethylhexyl, nonyl, decyl, dodecyl, tridecyl (from Oxo process), octadecyl, eicosyl, etc. As cycloalkyl radicals, cyclopentyl, cyclohexyl, etc. can most conveniently be employed. It is also possible to utilize unsaturated cycloaliphatics, e.g., cyclopentadienyl. The straight chain aliphatics can also be unsaturated, vinyl, allyl, etc. groups being suitable.

The course of our preferred process is indicated by the following reaction

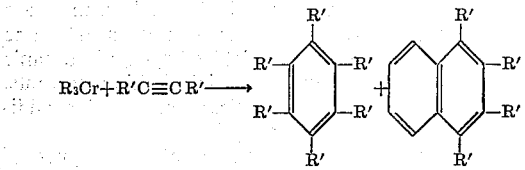

in which R is an organic, preferably hydrocarbon radical, and R' is an organic, preferably hydrocarbon radical. Only when R is phenyl is any of the naphthalene compound obtained. Of course, when R represents a bicyclic aromatic structure, some tricyclic product is obtained, etc. In the above reaction the R' on one acetylene carbon atom is quite often the same, but can be different, from that on the other acetylene carbon atom.

The polymerization reactions of the present invention are generally conducted in the presence of tetrahydrofuran, but any other Grignard solvent capable of complexing the trivalent chromium compounds to assure a fairly stable form thereof for reaction would be suitable. It is presumed that the reaction involves replacement of the three complexing tetrahydrofuran molecules in a, for example, trialkyl chromium tri-tetrahydrofuranate with three molecules of acetylene, to give an intermediate complex from which the substituted benzenes are then formed. However, we do not wish to be bound by any theory of the course of the reaction, as it is an effective reaction and the catalysts are effective, irrespective of what intermediates may be formed in the reaction.

Whenever chromium halide is utilized in the reactions herein, it is generally advantageous to employ it in the form of its tetrahydrofuranate in order to have it in an organic solvent-soluble form. The chromium halide tetrahydrofuranates and their preparation are described and claimed in our aforesaid copending application S.N. 698,376.

One especially notable aspect of our invention is the fact that it is possible to react the reagents utilized in preparing the tri-covalent chromium catalyst, including even the magnesium turnings, simultaneously in the same reaction vessel with the di-substituted acetylene compound, and obtain the substituted benzene compounds as products substantially as though the various steps of the reaction were conducted separately. The reactions which are believed to occur in such a procedure can be illustrated by the following equations, utilizing phenyl bromide as an example of an organic compound capable of forming a Grignard reagent, and CrCl₃ as an example of a trivalent chromium compound (THF represents tetrahydrofuran).

$$C_6H_5Br + Mg \rightarrow C_6H_5MgBr$$
$$3C_6H_5MgBr + CrCl_3(THF)_6 \rightarrow (C_6H_5)_3Cr(THF)_3 + 3MgBrCl(THF)$$
$$(C_6H_5)_3Cr(THF)_3 + 3CH_3C\equiv CCH_3 \rightarrow (C_6H_5)_3Cr(CH_3C\equiv CCH_3)_3 + 3THF$$

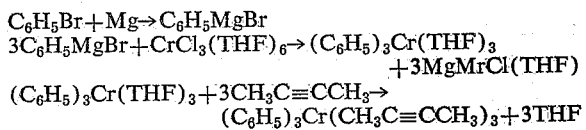

The polymerization processes of the present invention include both polymerizations which produce true polymers, e.g., high molecular weight polymers, and polymerizations in which only a very limited number of molecules are condensed together to produce compounds having a definite and fixed number of atoms. The polymeric products can be employed in the manner of other polymeric materials in the field of synthetic resins, plastics, and the like; for example, the polymers can have charcoal or graphite like character and can be employed as absorbents or fillers in synthetic resins. The definite compounds produced, such as substituted benzenes, are in general known compounds or homologs of same having recognized value in the field of synthetic organic chemistry, and can be used as high boiling solvents, hydraulic fluids, plasticizers, lubricant or gasoline additives, organic intermediates, and the like.

It will be recognized, of course, that some types of products will have greater value than other types. However, the only essential feature of the invention in polymerization is the discovery of a catalyst system which effects condensation of unsaturated systems.

The importance and value of our invention is apparent from the fact that it provides a new synthesis of aromatic molecules. Acetylenes are, of course an old and well known class of chemicals and extensive work has been carried out in an effort to find useful condensations of acetylenes. The present discovery now provides a procedure for condensing acetylenes under mild, controlled conditions to obtain specific, identifiable aromatic compounds.

For an acetylene to condense to an aromatic compound according to the present invention, it is necessary that it be di-substituted. Any alkynes other than 1-alkynes are suitable for such purpose, for example, non-alpha alkynes of 4 to 20 or more carbon atoms, particularly the non-alpha alkynes of 4 to 10 carbon atoms. Suitable alkynes are, for example, those di-substituted acetylenes in which the substituents are any of the straight or forked chain alkyl radicals named hereinabove with respect to suitable alkyl radicals attached to the chromium in the tri-covalent chromium compound, and, in fact, aryl and cycloalkyl substituents are also suitable and any of the aryl or cycloalkyl radicals named with respect to the chromium above are also suitable substituents for the acetylenes to be condensed to substituted benzenes. Moreover, acetylenes substituted by heterocyclic substituents are also suitable and produce benzenes containing heterocyclic substituents. As specific examples of non-alpha alkynes and other di-substituted acetylenes suitable for conversion to substituted benzenes, the following can be mentioned: 2-butyne, 2-pentyne, 2-hexyne, 3-hexyne, 2-octyne, 3-octyne, 2,2-dimethyl-3-hexyne, 2-methyl-3-heptyne, 5-decyne, 4-dodecyne, 6-hexadecyne, 2-eicosyne, dicarbethoxyacetylene, diphenylacetylene, α-phenyl-β-methylacetylene, α-phenyl-methyl-β-methylacetylene, di-α-naphthylacetylene, 1-anthracyl-propyne, p-tolylethylpropyne di-p-tolyl-acetylene, α-xylyl-β-methylacetylene, etc.

It is also possible to utilize mono-substituted acetylenes, or acetylene itself, but in such cases the reaction goes predominantly to the production of polymeric materials rather than to the lower cyclic condensates. Nevertheless, the condensation reactions of these molecules such as, for example, phenylacetylene, methylacetylene, ethylacetylene, β-naphthylacetylene, cyclohexylacetylene, etc., or carboxyethylacetylene, hydroxyethylacetylene, etc., over tri-covalent chromium produce useful products and are considered part of the present invention.

In addition to the ring-forming condensations which are extensively described herein by way of example, it will now be realized that unsaturated compounds such as olefins, e.g., 2-butene, will condense with tri-covalent chromium to form saturated ring systems, for example, cyclohexanes such as hexamethylcyclohexane; or nitriles, e.g., methyl cyanide, can be condensed to form triazines, e.g., trimethyl-1,3,5-triazine.

In general the reactions described herein, as exemplified by the heterogeneous reaction of triphenylchromium tri-tetrahydrofuranate with 2-butyne, take place fairly rapidly circa room temperature and are followed by hydrolysis and ether extraction to obtain a mixed crystalline product which can be separated by fractional crystallization of such derivatives as the picrates.

The following examples are illustrative of certain embodiments of the invention. In the examples, 2-butyne is employed as exemplary of di-substituted acetylenes, and phenylacetylene is exemplary of mono-substituted acetylenes.

EXAMPLE 1

An 800 ml. tetrahydrofuran solution of triphenyl chromium containing 67.2 millimoles of the triphenyl chromium was placed in a flask under nitrogen and 105 ml. (1.35 moles) of 2-butyne (B.P. 27°, dried over Drierite) was added at room temperature. In about 15 minutes reaction occurred and the temperature rose to 50° C., and the mixture became brown-black in color. About two-thirds of the solvent was removed by distillation under vacuum at 30° C., and the residue was hydrolyzed by addition of 0.6 liter of water. The resulting hydrolysis mixture was filtered to remove a dark salt and give a yellow orange filtrate. An aqueous solution of sodium tetraphenylboron was added to the filtrate and 1.5 grams of tetraphenylboron salt precipitated. The salt exhibited good stability in organic solvents but decomposed to some extent upon standing about one hour in acetone. The acetone was evaporated and the residue was then sublimed to give colorless crystals of hexamethyl benzene, M.P. 158–160° C.; a mixed melting point with pure hexamethyl benzene was 161–164° C. Infrared analysis indicated the compound to be hexamethyl benzene admixed with less than .5%, 1,2,3,4-tetramethylnaphthalene. A sample of the tetraphenylboron salt of pure bishexamethylbenzene chromium prepared by an entirely different procedure showed the same stability in solvents as the above tetraphenylboron salt, and its decomposition in acetone gave pure hexamethylbenzene.

The salt filtered from the hydrolysis mixture above was treated with 2 N sulfuric acid and the resulting mixture was extracted three times with ether. The ether extracts were concentrated and 10.93 grams of solids crystallized. A hot, concentrated solution of the solids in ethanol was mixed with a cold, saturated ethanol solution containing 16 grams of picric acid, to produce 23.4 grams of an orange picrate. Stepwise concentration of a warm solution of this picrate gave 6 or 7 crystal fractions, of which the first two were orange-red needles of pure 1,2,3,4 - tetramethylnaphthalene picrate, M.P. 183.5–184.5.

*Analysis.*—Calcd. for $C_{20}H_{19}N_3O_7$: C, 58.11; H, 4.63; N, 10.17. Found: C, 58.13; H, 4.34; N, 10.55.

Cleavage of the picrate with aqueous ammonia yielded pure 1,2,3,4-tetramethylnaphthalene, M.P. 107–108.5° C.

*Analysis.*—Calcd. for $C_{14}H_{16}$: C, 91.25; H, 8.75.

Found: C, 91.45; H, 8.59. The analysis was confirmed by infrared and ultraviolet analyses.

The end fraction of the above fractional crystallization consisted mainly of hexamethylbenzene picrate, which was purified by recrystallization to pure hexamethylbenzene, M.P. 175–176° C. Cleavage with aqueous ammonia gave hexamethylbenzene, M.P. 165–167° C. A mixed melting point with a known sample of hexamethylbenezene was 165–167° C. Careful fractional recrystallization of the intermediate fractions from the above fractional crystallization gave total amounts of 4.70 grams 1,2,3,4-tetramethylnaphthalene and 5.32 grams of hexamethylbenzene, for yields respectively of 38.0% and 48.8% (based on triphenylchromium).

EXAMPLE 2

A condensation was carried out according to the procedure of Example 1 except that a triphenylchromium to 2-butyne mol ratio of 1:3 was employed in place of the 1:20 mol ratio of Example 1, only 15.7 ml. of 2-butyne being employed. In about 90 minutes exothermic reaction and color change was apparent. After standing for about three days, the solution was concentrated, hydrolyzed and filtered to give a solid salt and an orange filtrate. An aqueous sodium tetraphenylboron solution was added and the resulting precipitate was dissolved in acetone and filtered from chromium hydroxide flakes which developed to give a practically colorless solution. The acetone was replaced by ethanol, and addition of picric acid caused precipitation of 0.28 gram 1,2,3,4 - tetramethylnaphthalene picrate, M.P. 182–184° C. Cleavage with aqueous ammonia gave pure 1,2,3,4-tetramethylnaphthalene. The salt from the filtration above was treated as in Example 1 to give 4.7 grams of 1,2,3,4-tetramethylnaphthalene by crystallization as the picrate from ethanolic solution. A second fraction from the ethanol yielded additional compound. The total of 5 grams 1,2,3,4-tetramethylnaphthalene represents a yield of 40.3% (based on triphenylchromium). The colorless ethanolic mother liquor upon dilution with aqueous ammonia yielded a 1.4 gram precipitate of diphenyl, M.P. 69.5–70° C. It will be noted that in this example 1,2,3,4-tetramethylnaphthalene was obtained in yield substantially equivalent to that of Example 1, but no hexamethylbenzene was produced. The effect of the mol ratio of triphenylchromium to butyne in controlling the relative amounts of the condensation products is further shown in Table I.

*Table I*

| $(C_6H_5)_3Cr$:Butyne Mol Ratio | Time to Start of Reaction, min. | Yield of Hexamethylbenzene, Percent | Yield of Tetramethylnaphthalene, Percent |
| --- | --- | --- | --- |
| 1:20 | 15 | 48.8 | 38 |
| 1:5 | 50 | 25.0 | 36 |
| 1:3 | 90 | | 40.3 |
| 1:2 | 280 | | 31 |
| 1:1 | 330 | | 13 |

That a phenyl chromium butyne complex is a necessary intermediate in the production of tetramethylnaphthalene by the above reactions is illustrated by the following control reactions which produced no condensation product.

(A) A 1 N phenylmagnesium bromide solution in tetrahydrofuran was treated with 2 ml. butyne. The mixture was allowed to stand for three days, refluxed three hours, hydrolyzed and extracted with ether, but evaporation of the extracts left no residue.

(B) A 50 ml. solution of tetrahydrofuran saturated with chromium trichloride was treated with 2 ml. butyne and then treated as in (A), but no residue was obtained.

(C) A 1 gram amount of powdered chromium trichloride tritetrahydrofuranate was treated with 9 ml. butyne, but no condensation product was obtained even after standing for four days.

EXAMPLE 3

An ethyl magnesium bromide solution was prepared from 9.8 grams ethylbromide, 3 grams magnesium and 300 ml. tetrahydrofuran. The yield by titration was 89% (80 millimoles). The solution was added dropwise with stirring to a 100 ml. tetrahydrofuran solution containing 10.1 grams chromium trichloride tri-tetrahydrofuranate (27 millimoles) at −20° C. Reaction started immediately and was complete in one hour to produce triethylchromium tetrahydrofuranate. A 45 ml. amount of 2-butyne (31.2 grams, 0.58 mole) was then added at −20° C. and the resulting mixture was kept at room temperature for three days. The black-brown solution was heated under vacuum at 30° C. to remove solvent, and the brown residue was then mixed with ethyl ether and 2 N sulfuric acid. The resulting green ether layer was concentrated, diluted with ethanol, and cooled to 0° C. to yield 2.40 grams of colorless crystals, M.P. 155–161° C. Distillation of the mother liquor under high vacuum gave 0.25 gram crystals, M.P. 152–160° C., for a total yield of fairly pure hexamethylbenzene of 2.65 grams, or 60.3% (based on triethylchromium). Recrystallization was practically quantitative and gave hexamethylbenzene of melting point, 163–164° C. The absence of a tetramethylnaphthalene from the product when triethylchromium is employed as catalyst further confirms the formation of intermediates from the organo chromium compound in the reaction.

EXAMPLE 4

An α-naphthyl magnesium bromide solution was prepared from 10.35 grams α-naphthalene bromide, 2.4 grams magnesium and 95 ml. tetrahydrofuran. The solution had a concentration of about 45 millimoles α-naphthyl magnesium bromide in 100 ml. solution. At −40° C. 66 ml. of the Grignard solution was added with stirring to 60 ml. tetrahydrofuran to which 3.72 grams chromium trichloride tri-tetrahydrofuranate had been added. The reaction started immediately and the mixture became wine-red in color. To the solution of tri(α-naphthyl)chromium, 2.34 ml. of 2-butyne was added with stirring at room temperature; the exothermic reaction was controlled by ice water-cooling. The reaction mixture was hydrolyzed with ice water and extracted with ether. The extracts were concentrated and diluted with alcohol and then boiled to remove ether. At 0° C., 1.01 grams of crystalline material was obtained. Sublimation of this material at 80° C. under vacuum gave 0.68 gram naphthalene as sublimate, and 0.33 gram 1,2,3,4-tetramethylphenanthrene as residue; the phenanthrene compound had a melting point of 85–86° C., and the picrate derivative melted at 139–141° C. The ethanol mother liquor above was treated with an ethanol solution of picric acid, and aditional product was obtained in the form of the picrate. The total yield of 1,2,3,4-tetramethylphenanthrene was 1.02 grams. The compound was recrystallized from ethanol to give colorless flakes, M.P. 87–89° C.

*Analysis.*—Calcd.: C, 92.26; H, 7.74. Found: C, 92.27; H, 7.90. This compound is of interest as a high energy fuel and also has utility as an organic intermediate, in preparing, for example, the corresponding diphenic acid by recognized procedures. Other 1,2,3,4-tetraalkylphenanthrenes have similar value, particularly those in which the alkyl radical is a straight or forked chain radical of 1 to 4 carbon atoms.

EXAMPLE 5

To a solution of 16.7 millimoles triethyl chromium in 120 ml. tetrahydrofuran prepared according to the procedure of Example 3 was added 8.5 grams of phenylacetylene. The mixture became brown-black in color in about one hour, and after standing for two days was hydrolyzed, acidified with 2 N sulfuric acid and extracted with ether. The solvent was evaporated from the extracts to leave a dark oil which was treated with ethanol to give a brown amorphous powder of softening point 65–88° C. The polymeric material had properties making it useful as an absorbent or a filler material for synthetic resins.

EXAMPLE 6

The reaction of 1.24 grams phenyl acetylene and 4 millimoles triphenyl chromium in 50 ml. tetrahydrofuran according to the procedure of Example 5 gave a yellow brown powder of softening point 70–130° C. and having similar properties to the product of Example 5.

EXAMPLE 7

Triphenyl chromium and phenylacetylene magnesium bromide in about 1:3 mol ratio in dilute tetrahydrofuran solution at −10° C. to give a brown solid following hydrolysis. Boiling the mixture before hydrolysis resulted in a brown amorphous powder.

EXAMPLE 8

At room temperature 0.5 gram chromium trichloride tritetrahydrofuranate, 1 gram powdered magnesium, 3 ml. 2-butyne and 15 ml. bromobenzene were mixed and stirred in a Schlenk tube. After 10 minutes a slight temperature rise was observed as the color of the mixture changed slowly from violet to red brown. After several hours the mixture became brown-black in color. The mixture was permitted to stand two days and was then hydrolyzed and extracted with ether. The ether extracts were concentrated to a small volume by evaporation of the ether, and some unchanged bromobenzene under vacuum. The residue was dissolved in glacial acetic acid and a salt was precipitated from the solution. The salt was recrystallized from ethanol to yield 0.12 gram of product which infrared analysis indicated to be 80% hexamethylbenzene and 20% 1,2,3,4-tetramethyl-naphthalene. The total yield of substituted benzenes was 54% (based on chromium). Thus, it is possible to utilize a heterogeneous reaction procedure in which 2-butyne is present in the reaction mixture with reactants capable of producing the triphenyl chromium compound, and in which the various reactions occur simultaneously, and it is not necessary to employ a step-wise procedure to produce the various intermediates. The heterogeneous reaction procedure is generally applicable to the condensation of the di-substituted acetylenes with the tricovalent chromium compounds as disclosed herein, and is applicable to the representative examples of the reactants as disclosed herein. However, in order to effect the reaction in one step as described above, it is necessary to employ the chromium halide in the form of its tetrahydrofuranate.

The present invention, of course, involves a novel reaction rather than specific conditions for carrying out such reaction. However, the following conditions will ordinarily be observed. The mol ratio of organo chromium to acetylenic compound will generally be in the range of about 1:1 to 1:20, but it is generally necessary to have at least 3 moles of acetylenic compound present if the maximum utilization of organo chromium compound in the preparation of substituted naphthalenes is to be effected. Of course, naphthalenes will be produced only when the chromium in the organo chromium compound contains phenyl substitutents; when 5 to 20 or more moles of acetylenic compound are present for each mole of organo chromium, the substituted naphthalenes are accompanied by monocyclic substituted benzenes, but the yield of naphthalenes is not diminished. When an alkyl chromium reactant is employed, mol ratios of chromium compound to acetylenic compound from 1:1 to 1:20, or greater or lesser, can be employed, and the yield based on chromium compound will generally improve with increase in the relative amounts of acetylenic compound.

The condensation reactions can be considered at temperatures varying from about −50° C. to +70° C., or to about the boiling point of tetrahydrofuran or the like, depending to some extent on the reactivity of the reactants, and can conveniently be effected by mixing the catalyst at lower temperatures and completing the reaction at higher temperatures; temperatures of the order of 10 to 30° C. or so or approximately room temperatures can conveniently be employed. The reactions can take from a few minutes to several hours, but in order to insure complete reaction and maximum yields the reaction mixture can be permitted to stand several days. The reaction is conducted under usual Grignard conditions as understood by those skilled in the art with exclusion of oxygen, moisture, etc.

The organo chromium compounds herein are referred to as catalysts as the end-result of the reactions is the condensation of unsaturated molecules with each other, but use of the term catalyst is not meant to imply that the organo chromium compound is not destroyed in the reaction. However, the success of the one-step reaction in Example 8 above presents the possibility of regenerating the catalyst in situ by addition of reactants during the condensation process.

As the chromium halide for use in our invention, anhydrous chromic chloride is very suitable, and chromic bromide and chromic iodide are also effective. Chromyl chloride ($CrO_2Cl_2$) is also suitable.

What we claim is:

1. The process of preparing benzenes and naphthalenes which comprises reacting acetylenes containing no acidic hydrogen with triarylchromium compounds to produce said benzenes and naphthalenes.

2. The process of preparing benzenes and naphthalenes which comprises treating non-alpha alkynes in tetrahydrofuran solution with triarylchromium, the mol ratios of triaryl chromium to alkyne being in the range of 1:1 to 1:20.

3. The process of claim 2 in which triphenyl chromium is employed.

4. The process of preparing tetramethylnaphthalene which comprises mixing dimethylacetylene and triphenyl-chromium in tetrahydrofuran in mol ratio of chromium compound to acetylene of from 1:1 to 1:20.

5. The process of claim 4 in which hexamethylbenzene is also produced.

6. The process of preparing monocyclic aryl hydrocarbons which comprises reacting acetylenes containing no acidic hydrogen with trialkylchromium compounds to produce monocyclic aryl hydrocarbons.

7. The process of preparing benzenes which comprises reacting an alkyl Grignard reagent with chromic trichloride and then treating with an acetylene containing no acidic hydrogen.

8. The process of preparing hexaalkyl benzenes which comprises treating ethyl magnesium bromide with chromic trichloride in tetrahydrofuran and then with a dialkylacetylene.

9. The process of preparing hexamethyl benzene which comprises treating ethyl magnesium bromide with chromic trichloride in tetrahydrofuran and then treating with dimethylacetylene.

10. The process of preparing aromatic compounds selected from the group consisting of benzenes, naphthalenes and phenanthrenes which comprises reacting together chromic halide tetrahydrofuranate, magnesium, organohalogen compound capable of forming an organomagnesium halide Grignard reagent with magnesium, and a non-alpha alkyne to produce said aromatic compounds selected from the group consisting of benzenes, naphthalenes and phenanthrenes.

11. The process of claim 10 in which an organomagnesium halide Grignard reagent is formed from the magnesium and organohalogen compound, which is then reacted with the chromium halide tetrahydrofuranate, followed by mixing with the non-alpha alkyne.

12. The process of preparing phenanthrenes which comprises treating a naphthyl Grignard reagent with chromic trichloride and then treating with an acetylene containing no acidic hydrogen.

13. Trialkylchromium tri-tetrahydrofuranate.

References Cited in the file of this patent

UNITED STATES PATENTS

| | | |
|---|---|---|
| 2,324,073 | Gaylor et al. | July 13, 1943 |
| 2,772,314 | Campbell | Nov. 27, 1956 |

FOREIGN PATENTS

| | | |
|---|---|---|
| 533,362 | Belgium | May 16, 1955 |

OTHER REFERENCES

Angewandte Chemie, volume 68, page 438, July 7, 1956.

Berger et al.: Chem. Abstracts, vol. 37, page 1764, sec. 8, Apr. 10, 1943.